(12) United States Patent
Hata et al.

(10) Patent No.: US 10,590,598 B2
(45) Date of Patent: Mar. 17, 2020

(54) HEAT-INSULATING PROTECTIVE MEMBER FOR SKID POST AND METHOD FOR APPLYING THE HEAT-INSULATING PROTECTIVE MEMBER FOR SKID POST

(71) Applicant: Mitsubishi Chemical Corporation, Chiyoda-ku (JP)

(72) Inventors: Yusaku Hata, Chiyoda-ku (JP); Mitsuo Suzuki, Chiyoda-ku (JP); Tomoyuki Kobayashi, Chiyoda-ku (JP); Akihiro Yano, Chiyoda-ku (JP)

(73) Assignee: Mitsubishi Chemical Corporation, Chiyoda-ku (JP)

( * ) Notice: Subject to any disclaimer, the term of this patent is extended or adjusted under 35 U.S.C. 154(b) by 275 days.

(21) Appl. No.: 15/526,344

(22) PCT Filed: Nov. 9, 2015

(86) PCT No.: PCT/JP2015/081462
§ 371 (c)(1),
(2) Date: May 12, 2017

(87) PCT Pub. No.: WO2016/076258
PCT Pub. Date: May 19, 2016

(65) Prior Publication Data
US 2017/0314186 A1     Nov. 2, 2017

(30) Foreign Application Priority Data

Nov. 14, 2014   (JP) ................................ 2014-231461
May 13, 2015    (JP) ................................ 2015-098111

(51) Int. Cl.
*D06M 11/44*        (2006.01)
*C04B 35/80*        (2006.01)
(Continued)

(52) U.S. Cl.
CPC ........... *D06M 11/44* (2013.01); *C04B 35/117* (2013.01); *C04B 35/44* (2013.01); *C04B 35/803* (2013.01);
(Continued)

(58) Field of Classification Search
CPC ...... D06M 11/44; C04B 35/117; C04B 35/44; C04B 35/803; D04H 1/4209; D04H 1/46;
(Continued)

(56) References Cited

U.S. PATENT DOCUMENTS

2014/0186599 A1    7/2014    Fukui et al.
2014/0272363 A1    9/2014    Hata et al.
2015/0299938 A1   10/2015    Hata et al.

FOREIGN PATENT DOCUMENTS

EP    2 754 647 A1    7/2014
EP    2 754 747 A1    7/2014
(Continued)

OTHER PUBLICATIONS

Search Report dated Nov. 29, 2018 in Taiwanese Patent Application No. 104137600 citing document AO therein, 2 pages (with English translation of categories of cited documents).
(Continued)

*Primary Examiner* — Vincent Tatesure
(74) *Attorney, Agent, or Firm* — Oblon, McClelland, Maier & Neustadt, L.L.P.

(57) ABSTRACT

A heat-insulating protective member for skid posts contains a needled blanket of inorganic fibers. At least some of the needled blanket has, disposed therein, an impregnation part where an oxide-precursor-containing liquid is adherent in an undried state. The impregnation part has a water content of 50-400 parts by mass per 100 parts by mass of the inorganic fibers of the impregnation part. The water content of the heat-insulating protective member is 50-400 parts by mass
(Continued)

per 100 parts by mass of the inorganic fibers of the heat-insulating protective member. The oxide-precursor-containing liquid contains ingredients that, upon burning, yield a composition containing $Al_2O_3$ and CaO. The oxide-precursor-containing liquid is adherent in an amount of 2-50 parts by mass in terms of oxide amount per 100 parts by mass of the inorganic fibers of the impregnation part. A molar ratio of Al/Ca, in the whole impregnation part is 10-330.

17 Claims, 1 Drawing Sheet

(51) Int. Cl.
| | |
|---|---|
| *D04H 1/4209* | (2012.01) |
| *D04H 1/46* | (2012.01) |
| *C04B 35/44* | (2006.01) |
| *C04B 35/117* | (2006.01) |
| *D04H 1/488* | (2012.01) |
| *D04H 1/64* | (2012.01) |
| *D04H 1/587* | (2012.01) |
| *F27D 1/00* | (2006.01) |
| *F27D 1/04* | (2006.01) |
| *D06M 11/45* | (2006.01) |
| *F16L 59/02* | (2006.01) |

(52) U.S. Cl.
CPC ............ *D04H 1/4209* (2013.01); *D04H 1/46* (2013.01); *D04H 1/488* (2013.01); *D04H 1/587* (2013.01); *D04H 1/64* (2013.01); *D06M 11/45* (2013.01); *F16L 59/026* (2013.01); *F27D 1/0009* (2013.01); *F27D 1/045* (2013.01); *C04B 2235/3208* (2013.01); *C04B 2235/3218* (2013.01); *C04B 2235/449* (2013.01); *C04B 2235/5228* (2013.01); *C04B 2235/5236* (2013.01); *C04B 2235/5264* (2013.01); *C04B 2235/616* (2013.01)

(58) Field of Classification Search
CPC .......... D04H 1/488; D04H 1/584; D04H 1/64; F16L 59/026; F27D 1/0009; F27D 1/045
USPC ........................................................ 442/117
See application file for complete search history.

(56) References Cited

FOREIGN PATENT DOCUMENTS

| | | |
|---|---|---|
| JP | 60-112947 A | 6/1985 |
| JP | 62-288178 A | 12/1987 |
| JP | 63-194051 A | 8/1988 |
| JP | 11-211357 A | 8/1999 |
| JP | 2011-32119 A | 2/2011 |
| JP | 2011-208344 A | 10/2011 |
| JP | 2014-5173 A1 | 1/2014 |
| JP | 2015-81752 A | 4/2015 |
| TW | 1038440 A | 1/1990 |
| WO | WO 2013/111553 A1 | 8/2013 |

OTHER PUBLICATIONS

Office Action dated Mar. 13, 2019 in the correspondence European Application No. 15 859 434.1.
Extended European Search Report dated Nov. 15, 2017 in Patent Application No. 15859434.1.
International Search Report dated Jan. 26, 2016 in PCT/JP2015/081462, filed Nov. 9, 2015.

HEAT-INSULATING PROTECTIVE MEMBER FOR SKID POST AND METHOD FOR APPLYING THE HEAT-INSULATING PROTECTIVE MEMBER FOR SKID POST

TECHNICAL FIELD

The present invention relates to heat-insulating protective members including an inorganic fiber formed article and specifically to a heat-insulating protective member for skid posts used in heating furnaces and blast furnaces.

BACKGROUND ART

For example, high-temperature furnaces used in the steel industry, such as heating furnaces, blast furnaces, and heat-treating furnaces, include cylindrical members having a bend, a corner, or a curved surface, such as high-temperature pipes and walking-beam skid posts. For protecting and heat-insulating these members, inorganic fiber assemblies and inorganic fiber formed articles have been used. In particular, needled inorganic fiber assemblies (i.e., needled blankets) have been widely used taking advantage of their properties, such as low weight, excellent formability, excellent thermal shock resistance, excellent wind erosion resistance, and low thermal conductivity. When needled blankets are applied to a target that is to be protected, they are compressed into formed articles, which are formed into a shape like a ring or a cut ring and subsequently fit on the target so as to be stacked on top of one another.

Heat-insulating protective members may be corroded by scale and alkaline gas generated in furnaces. In particular, in heating furnaces used in the steel industry, heat-insulating protective members may be physically damaged from iron oxide present in the furnaces. Furthermore, the inorganic fibers may form low-melting compounds, which act as sources of erosion and embrittlement. As a result, heat-insulating protective members may be degraded at an early stage.

In order to address the above issues, there have been reported various inorganic fiber formed articles that include an inorganic fiber assembly to which an inorganic sol, a binder, and the like are added.

For example, PTL 1 describes an inorganic fiber block having high corrosion resistance which is produced by applying an alumina sol or a mixed sol including an alumina sol and a silica sol onto a surface oriented in the direction in which blankets are stacked such that the amount of the alumina sol or the mixed sol deposited is 55 to 300 g/m² in terms of solid component and drying the resulting coating layer.

PTL 2 describes an inorganic fiber block provided with a coating layer having a thickness of 2 mm which is formed by spraying an anti-FeO coating material onto the surface of the inorganic fiber block placed in a furnace. It is also described that the coating layer includes particles of CA6 ($CaO \cdot 6Al_2O_3$).

PTL 3 describes a lightweight inorganic fiber formed article having a bulk density of 0.08 to 0.20 g/cm³ which is produced by impregnating a needled blanket composed of inorganic fibers with an inorganic sol and drying the impregnated needled blanket.

PTL 4 describes a refractory covering material capable of being applied without degrading flexibility which is produced by depositing cement on a felt-like mat composed of refractory fibers and moistening the mat by spraying water to the mat or immersing the mat in water. PTL 5 describes a technique in which a wet fiber felt material prepared by impregnating inorganic fibers with colloidal silica serving as an inorganic binder is arranged on the surface of a steel beam. PTL 6 describes a wet refractory heat-insulating material produced by forming a water slurry including inorganic fibers, a binder, and an inorganic powder into a shape.

PTL 7 describes a method in which a needled blanket composed of inorganic fibers is impregnated with an inorganic sol, the impregnated needled blanket is dried to form a cylindrical inorganic fiber formed article, which is divided into pieces in the direction parallel to the shaft center of the cylinder, and the pieces are arranged on a cylindrical member.

PTL 1: JP H11-211357 A
PTL 2: JP 2011-32119 A
PTL 3: JP 2011-208344 A
PTL 4: JP S60-112947 A
PTL 5: JP S63-194051 A
PTL 6: JP S62-288178 A
PTL 7: JP 2014-5173 A

In the inorganic fiber blocks described in PTLs 1 and 2, the coating layer formed by the application or spraying of the coating material are difficult to permeate into the inside of the fibers and likely to solidify on the surfaces of the inorganic fibers. Thus, the coating layer is likely to detach from the inorganic fiber block formed article. Accordingly, the coating layer is likely to detach from the inorganic fiber block formed article due to thermal shock, mechanical shock, or the like and, as a result, the inorganic fibers present inside the inorganic fiber block may be exposed. In PTL 2, after the inorganic fiber formed article has been applied to walls of a furnace, a coating material is applied to the walls of the furnace with a spray gun. Thus, the process for applying the inorganic fiber formed article to the furnace is complex. In addition, after the spraying of the coating material and the following drying-firing step have been terminated, the surface of the inorganic fiber block becomes hard, and the thermal shock resistance becomes degraded.

The inorganic fiber formed article described in PTL 3 is produced by impregnating the entirety of the needled blanket with the inorganic sol and drying the impregnated needled blanket. Therefore, the inorganic fiber formed articles are inflexible and not capable of being tightly arranged on a bend, a corner, a curved surface, or the like without any gap therebetween.

The refractory covering materials described in PTLs 4 and 5 are flexible since they are in a wet state. However, in PTL 4, cement is deposited on the mat, which is subsequently moisturized. This requires a complex process. In PTL 5, where colloidal silica is used as an inorganic binder with which inorganic fibers are impregnated, it is not possible to achieve sufficient scale resistance.

Moreover, moisture content is not discussed in PTLs 4 and 5. Thus, in PTLs 4 and 5, the refractory covering materials are heavy, poor in workability, and difficult to be fixed to a member that is to be protected. The lack of control of wetness may result in a phenomenon referred to as "migration" in which the inorganic binder is solidified on the surface when drying is performed. Furthermore, the amount of deposited binder may become excessively large. This increases the local density of the surface portion and thermal shrinkage ratio. In addition, the thermal shock resistance may be degraded. This results in cracking and detachment of the surface. In the application methods described in the patent literatures above, moreover, gaps may be created therebetween when being heated and shrunken. This significantly reduces the heat-insulating property and degrades the scale resistance (resistance to FeO).

The refractory heat-insulating material described in PTL 6 is flexible since it maintains a slurry form. However, the refractory heat-insulating material has a low mechanical strength and is likely to be torn when being applied to a target that is to be protected.

The inorganic fiber formed article described in PTL 7 is capable of being tightly arranged on a member having a cylindrical shape or the like without any gap therebetween. However, since the inorganic fiber formed article has low flexibility, it becomes impossible to apply the inorganic fiber formed article to the member that is to be protected when the cylindrical shape was changed by deformation. Since members that are to be protected in heating furnaces are particularly likely not to have a consistent shape but deform due to erosion by scale or deformation by heat, it is not possible to apply the inflexible inorganic fiber formed article to such members.

SUMMARY OF INVENTION

It is an object of the present invention to address the above-described issues and provide a heat-insulating protective member and, specifically, a heat-insulating protective member for skid posts that include an inorganic fiber formed article which has excellent scale resistance, excellent flexibility, a high strength of the formed article, and excellent workability.

A heat-insulating protective member for skid posts of the present invention is used for protecting skid posts. The heat-insulating protective member comprises a needled blanket including inorganic fibers, in which at least a part of the needled blanket is an impregnated portion including an oxide-precursor-containing liquid that is undried, an amount of moisture included in the impregnated portion is 50 to 400 parts by mass relative to 100 parts by mass of the inorganic fibers included in the impregnated portion, an amount of moisture included in the entirety of the heat-insulating protective member is 50 to 400 parts by mass relative to 100 parts by mass of the inorganic fibers included in the entirety of the heat-insulating protective member, the oxide-precursor-containing liquid includes a component that forms an alumina-calcia composition including aluminum oxide and calcium oxide when the oxide-precursor-containing liquid is fired, an amount of the oxide-precursor-containing liquid deposited on the impregnated portion is 2 to 50 parts by mass relative to 100 parts by mass of the inorganic fibers included in the impregnated portion in terms of the amount of oxide, and a molar ratio of Al to Ca included in the entirety of the impregnated portion is 10 or more and 330 or less.

In one of embodiment of the present invention, the oxide-precursor-containing liquid is tinted, and the impregnated portion is tinted accordingly.

In one of embodiment of the present invention, the impregnated portion continuously extends over a region that is at least half a surface of the needled blanket and, in the region over which the impregnated portion extends, the impregnated portion extends over the entire thickness of the needled blanket including inorganic fibers.

Advantageous Effects of Invention

The heat-insulating protective member for skid posts according to the present invention, which is produced by impregnating a needled blanket composed of inorganic fibers with an oxide-precursor-containing liquid, has high scale resistance.

Specifically, in the present invention, the molar ratio of Al to Ca included in the entire impregnated portion (Al/Ca) is 10 to 330. This enables an appropriate amount of CaO to diffuse into the inside of the inorganic fibers when firing is performed to a high temperature. CaO present inside the inorganic fibers reduces the likelihood of FeO diffusing into the inside of the inorganic fibers. In other words, this limits the reaction between the inorganic fibers and FeO and enhances the scale resistance of the heat-insulating protective member for skid posts.

The heat-insulating protective member for skid posts according to the present invention, which is impregnated with an oxide-precursor-containing liquid that is undried, is flexible and has excellent workability and adhesion particularly to a bend, a corner, and a curved surface. The amount of moisture included in the heat-insulating protective member for skid posts according to the present invention is controlled appropriately. Thus, the heat-insulating protective member for skid posts has a high mechanical strength and excellent workability.

The heat-insulating protective member for skid posts according to the present invention can be deposited on and fixed to a skid post readily in a simple manner.

DESCRIPTION OF EMBODIMENTS

Embodiments of the present invention are described below in detail. Note that, the embodiments described below are merely examples (typical examples) of embodiments of the present invention and do not limit the present invention.

The heat-insulating protective member for skid posts according to the present invention is a heat-insulating protective member for skid posts which is used for protecting skid posts, the heat-insulating protective member including a needled blanket including inorganic fibers. At least a part of the needled blanket is an impregnated portion including an oxide-precursor-containing liquid that is undried. The amount of moisture included in the impregnated portion is 50 to 400 parts by mass relative to 100 parts by mass of inorganic fibers included in the impregnated portion. The amount of moisture included in the entirety of the heat-insulating protective member is 50 to 400 parts by mass relative to 100 parts by mass of inorganic fibers included in the entirety of the heat-insulating protective member. The oxide-precursor-containing liquid includes a component that forms an alumina-calcia composition when the oxide-precursor-containing liquid is fired, the alumina-calcia composition including aluminum oxide ($Al_2O_3$) and calcium oxide (CaO) ($Al_2O_3$ and CaO may be single oxides or in the form of a composite oxide). The amount of the oxide-precursor-containing liquid deposited on the impregnated portion is 2 to 50 parts by mass relative to 100 parts by mass of inorganic fibers included in the impregnated portion in terms of the amount of oxide. The molar ratio of Al to Ca included in the entirety of the impregnated portion (i.e., entirety of the inorganic fibers and the substance deposited thereon) (Al/Ca) is 10 or more and 330 or less.

[Needled Blanket]

The needled blanket composed of inorganic fibers which is included in the heat-insulating protective member for skid posts according to the present invention (hereinafter, referred to simply as "blanket" or "needled blanket") is described below.

The needled blanket is preferably produced by needling a fiber assembly composed of inorganic fibers that substantially do not include fibers having a diameter of 3 μm or less. Using such a needled blanket enhances the wind erosion resistance of the heat-insulating protective member for skid posts according to the present invention.

<Inorganic Fibers>

The inorganic fibers constituting the needled blanket are not limited. Examples of the inorganic fibers include mono-component fibers composed of silica or alumina-silica, mono-component fibers composed of zirconia, spinel, titania, or calcia that includes silica or alumina, and composite fibers including the above fibers. Alumina-silica fibers and, specifically, polycrystalline alumina-silica fibers are particularly preferable in terms of heat resistance, the strength (toughness) of fibers, and safety.

The compositional ratio (mass ratio) of alumina to silica included in the alumina-silica fibers is preferably in the range of 65 to 98/35 to 2, which is referred to as "mullite composition" or "high-alumina composition", is more preferably in the range of 70 to 95/30 to 5, and is particularly preferably in the range of 70 to 74/30 to 26.

In the present invention, it is preferable that 80% by mass or more, preferably 90% by mass or more, and particularly preferably the entirety of the inorganic fibers be polycrystalline alumina-silica fibers having the above mullite composition. The molar ratio of Ca to Al included in the inorganic fibers (Ca/Al) is preferably 0.03 or less. It is particularly preferable that the inorganic fibers do not contain Ca.

The inorganic fibers substantially do not include fibers having a diameter of 3 μm or less. The expression "do not include fibers having a diameter of 3 μm or less" means that the amount of fibers having a diameter of 3 μm or less is 0.1% by mass or less of the weight of the entire fibers.

The average diameter of the inorganic fibers is preferably 5 to 7 μm. If the average diameter of the inorganic fibers is excessively large, the elasticity and toughness of the fiber assembly may be degraded. If the average diameter of the inorganic fibers is excessively small, the amount of dust particles suspended in the air may be increased. In addition, the likelihood of fibers having a diameter of 3 μm or less being included in the inorganic fibers may be increased.

<Method for Producing Needled Blanket>

The inorganic fiber assembly having the preferable average diameter described above and substantially not including fibers having a diameter of 3 μm or less may be produced by a sol-gel method while controlling, for example, the viscosity of a spinning liquid, the stream of air supplied to a spinning nozzle, the drying of oriented yarn, and needling.

The needled blanket may be produced by any method known in the related art such as the method described in JP 2014-5173 A, which includes a step in which an inorganic-fiber-precursor assembly is formed by a sol-gel method, a step in which the inorganic-fiber-precursor assembly is needled, and a step in which the needled inorganic-fiber-precursor assembly is fired to form an inorganic fiber assembly.

<Needle-Punch Density, Bulk Density, and Thickness of Needled Blanket>

The needle-punch density of the needled blanket may be 2 to 200 punches/cm$^2$, is more preferably 2 to 150 punches/cm$^2$, is particularly preferably 2 to 100 punches/cm$^2$, and is most preferably 2 to 50 punches/cm$^2$. If the needle-punch density is excessively low, for example, the consistency in the thickness of the needled blanket may be degraded. Furthermore, the thermal shock resistance may be degraded. If the needle-punch density is excessively high, the fibers may be damaged, and the risk of the fibers scattering after firing has been performed may be increased.

The bulk density of the needled blanket is preferably 50 to 200 kg/m$^3$ and is more preferably 80 to 150 kg/m$^3$. If the bulk density is excessively low, a brittle inorganic fiber formed article may be formed. If the bulk density is excessively high, the mass of the inorganic fiber formed article is increased. Moreover, the elasticity of the inorganic fiber formed article may be degraded. This degrades the toughness of the formed article.

The surface density of the needled blanket may be 500 to 4000 g/m$^2$, is more preferably 600 to 3800 g/m$^2$, and is particularly preferably 1000 to 2000 g/m$^2$. If the surface density of the needled blanket is excessively low, the thickness of the formed article needs to be considerably reduced since the amount of fibers is small. This reduces the utility of the inorganic fiber formed article as a heat-insulating material. If the surface density of the needled blanket is excessively high, the amount of fibers is excessively large. This makes it difficult to control the thickness of the needled blanket by needling.

The thickness of the needled blanket is preferably about 2 to 35 mm. In order to maintain the impregnation depth of the oxide-precursor-containing liquid, which is described below, to be 3 mm or more and preferably 10 mm or more, the thickness of the needled blanket is preferably 3 mm or more and is particularly preferably 10 mm or more.

In the present invention, the needled blanket composed of inorganic fibers is formed into a tabular shape in order to produce a tabular inorganic fiber formed article according to the present invention which has the dimensions described below. The tabular needled blanket may be formed into a roll-like shape for handling.

[Oxide-Precursor-Containing Liquid]

The oxide-precursor-containing liquid with which the above needled blanket is impregnated includes an oxide precursor that is a component that forms an alumina-calcia composition including aluminum oxide ($Al_2O_3$) and calcium oxide (CaO) when firing is performed. $Al_2O_3$ and CaO included in the alumina-calcia composition may be single oxides or in the form of a composite oxide of $Al_2O_3$ and CaO. Examples of the composite oxide of $Al_2O_3$ and CaO include, but are not limited to, $CaO.Al_2O_3$, $CaO.2Al_2O_3$, and $CaO.6Al_2O_3$.

If only the oxide-precursor-containing liquid is dried and fired, the oxides included in the resulting substance would be present in any of the following states (i) to (v).

(i) $Al_2O_3$ single oxide and CaO single oxide (ii) $Al_2O_3$ single oxide, CaO single oxide, and the composite oxide (iii) $Al_2O_3$ single oxide and the composite oxide (iv) CaO single oxide and the composite oxide (v) the composite oxide only Specific examples of a component that forms CaO when firing is performed include a hydroxide, a chloride, an acetic acid salt, a lactic acid salt, a nitric acid salt, and a carbonic acid salt of calcium. The oxide-precursor-containing liquid may contain only one of the above components or two or more of the above components. In particular, an acetic acid salt, a hydroxide, and a carbonic acid salt of calcium are preferable because the components generated from the above substances when firing is performed are mainly water and carbon dioxide, which do not degrade metal members, steel plates, and the like included in furnaces.

The component that forms CaO when firing is performed may be dissolved in the oxide-precursor-containing liquid or included in the oxide-precursor-containing liquid in the form of a sol or a dispersion. The component that forms CaO when firing is performed is preferably dissolved or uniformly dispersed in the oxide-precursor-containing liquid because, in such a case, an oxide precursor can be deposited uniformly over the entire surface of each of the inorganic fibers constituting the needled blanket. In addition, the inside of the inorganic fibers can be impregnated with the oxide-precursor-containing liquid readily. If the component that forms CaO when firing is performed is precipitated in the oxide-precursor-containing liquid, the oxide precursor may fail to be deposited uniformly over the entire surfaces of the inorganic fibers. That is, some portions of the surfaces of the fibers may fail to be covered with the oxide precursor and are likely to be eroded by scale. Thus, in such a case, the scale resistance may fail to be enhanced to a sufficient degree.

Specific examples of a component that forms $Al_2O_3$ when firing is performed include a hydroxide, a chloride, an acetic acid salt, a lactic acid salt, a nitric acid salt, and a carbonic acid salt of aluminum. The oxide-precursor-containing liquid may contain only one of the above components or two or more of the above components. In particular, an acetic acid salt, a hydroxide, and a carbonic acid salt of aluminum are preferable because the components generated from the above substances when firing is performed are mainly water and carbon dioxide, which do not degrade metal members, steel plates, and the like included in furnaces.

The component that forms $Al_2O_3$ when firing is performed may be dissolved in the oxide-precursor-containing liquid or included in the oxide-precursor-containing liquid in the form of a sol or a dispersion. The component that forms $Al_2O_3$ when firing is performed is preferably dissolved or uniformly dispersed in the oxide-precursor-containing liquid because, in such a case, an oxide precursor can be deposited uniformly over the entire surface of each of the inorganic fibers constituting the needled blanket. In addition, the inside of the inorganic fibers can be impregnated with the oxide-precursor-containing liquid readily. If the component that forms $Al_2O_3$ when firing is performed is precipitated in the oxide-precursor-containing liquid, the oxide precursor may fail to be deposited uniformly over the entire surfaces of the inorganic fibers. That is, some portions of the surfaces of the fibers may fail to be covered with the oxide precursor and are likely to be eroded by scale. Thus, in such a case, the scale resistance may fail to be enhanced to a sufficient degree.

The component that forms $Al_2O_3$ when firing is performed is preferably an alumina sol including acetic acid serving as a dispersant. Such an alumina sol is advantageous because the components generated from the alumina sol when firing is performed are water and carbon dioxide. For the same reasons, an alumina sol including lactic acid serving as a dispersant may also be used. However, a heat-insulating protective member for skid posts which is produced using an alumina sol including lactic acid serving as a dispersant is likely to have a higher thermal shrinkage ratio than that produced using an alumina sol including acetic acid serving as a dispersant.

In the case where the above alumina sol is used, the component that forms CaO when firing is performed is preferably an acetic acid salt of calcium. Mixing an acetic acid salt with the alumina sol limits the degradation of the dispersibility of the alumina sol and an increase in the viscosity of the oxide-precursor-containing liquid. Setting the viscosity of the oxide-precursor-containing liquid to be within an appropriate range increases ease of impregnation and ease of controlling the amount of oxide-precursor-containing liquid deposited. If the viscosity of the oxide-precursor-containing liquid is excessively high, it becomes difficult to impregnate the inorganic fiber with the oxide-precursor-containing liquid.

The oxide-precursor-containing liquid is preferably an aqueous calcium acetate solution including an alumina sol dispersed therein.

The oxide-precursor-containing liquid preferably includes the component that forms $Al_2O_3$ when firing is performed and the component that forms CaO when firing is performed such that the molar ratio of Al to Ca (Al/Ca) is 4 or more and 100 or less, is more preferably 6 or more and 36 or less, and is particularly preferably 9 or more and 13 or less. When the Al/Ca ratio falls within the above range, the diffusion of the calcium component occurs at an adequate degree upon heating being performed in a furnace to limit the reaction between the inorganic fibers and scale. Furthermore, a calcium oxide-based oxide having high scale resistance is formed. This further enhances the scale resistance.

The concentration of the oxide precursor in the oxide-precursor-containing liquid (total content of the component that forms $Al_2O_3$ when firing is performed and the component that forms CaO when firing is performed) is preferably set such that the concentration of the solid component in the oxide-precursor-containing liquid is 2% to 30% by mass and is particularly preferably 5% to 10% by mass in terms of the amount of oxide. If the concentration of the oxide precursor in the oxide-precursor-containing liquid is excessively low, the amount of oxide precursor component deposited on the needled blanket (deposited amount) may be reduced. If the concentration of the oxide precursor in the oxide-precursor-containing liquid is excessively high, the viscosity of the oxide-precursor-containing liquid may be increased. This makes it difficult to impregnate the inorganic fibers with the oxide-precursor-containing liquid.

As described above, the oxide-precursor-containing liquid is preferably a sol or a solution in order to deposit the oxide precursor uniformly over the entire surface of each of the inorganic fibers constituting the needled blanket.

A dispersion medium or a solvent included in the oxide-precursor-containing liquid may be water, an organic solvent such as an alcohol, or a mixture thereof and is preferably water. The oxide-precursor-containing liquid may optionally include a polymer component such as polyvinyl alcohol. A dispersion stabilizer may be added to the oxide-precursor-containing liquid in order to enhance the stability of the compounds included in the sol or the solution. Examples of the dispersion stabilizer include acetic acid, lactic acid, hydrochloric acid, nitric acid, and sulfuric acid.

The oxide-precursor-containing liquid may optionally include a colorant. Tinting the oxide-precursor-containing liquid enables an impregnated portion and a non-impregnated portion of the needled blanket to be visually confirmed. It is preferable to tint the oxide-precursor-containing liquid black or blue. The colorant may be, for example, a water-soluble ink.

A preferable amount of oxide-precursor-containing liquid included in the needled blanket is described below.

[Method for Impregnating Needled Blanket with Oxide-Precursor-Containing Liquid]

For impregnating the needled blanket composed of inorganic fibers with the above-described oxide-precursor-containing liquid, the needled blanket may be immersed in the oxide-precursor-containing liquid such that the oxide-precursor-containing liquid permeates into gaps between the inorganic fibers constituting the needled blanket.

After the needled blanket has been impregnated with the oxide-precursor-containing liquid, the excess liquid may be removed as needed by suction or compression such that the desired moisture content and the desired amount of oxide precursor deposited are achieved. For removing the excess liquid by suction, it is preferable to use an attachment capable of covering the impregnated portion and remove the excess liquid by suction through a suction port formed in the attachment.

After the needled blanket has been impregnated with the oxide-precursor-containing liquid and the excess liquid has been removed as needed in the above-described manner, the needled blanket may optionally be dried until the predetermined moisture content is achieved. This makes it possible to reduce the moisture content while maintaining the amount of oxide precursor deposited (deposited amount) to be large. Reducing the moisture content increases the adhesion of the heat-insulating protective member to adhesives in the application of the heat-insulating protective member. In addition, the mass of the inorganic fiber formed article can be reduced while the flexibility of the inorganic fiber formed article is maintained. This increases ease of application of the inorganic fiber formed article. The above drying step may be conducted at 80° C. to 180° C. for 0.5 to 24 hours. The drying conditions may be set appropriately depending on the amount of moisture that is to be removed.

The amount of oxide-precursor-containing liquid deposited is preferably, as described below, 2 to 50 parts by mass relative to 100 parts by mass of the inorganic fibers in terms of the amount of oxides (CaO and $Al_2O_3$).

[Position of Impregnated Portion in Needled Blanket]

In the heat-insulating protective member for skid posts according to the present invention, at least a portion of the needled blanket composed of inorganic fibers is an impregnated portion that is impregnated with the oxide-precursor-containing liquid in the above-described manner (hereinafter, referred to simply as "impregnated portion"). The impregnated portion is undried.

The impregnated portion is preferably formed in a surface (heated surface) of the heat-insulating protective member for skid posts which is exposed to a heating furnace to which the heat-insulating protective member for skid posts is applied. This is because the non-impregnated portion may be eroded by scale. Forming the impregnated portion over the entire surface that is to be heated by the furnace enhances the scale resistance.

The depth of impregnation in the thickness direction of the blanket is preferably at least 3 mm and is more preferably 10 mm or more from the surface of the blanket which is exposed to the inside of the furnace. Setting the impregnation depth to be the lower limit or more enhances the scale resistance. It is preferable to impregnate the needled blanket with the oxide-precursor-containing liquid over the entire thickness because, in such a case, the scale resistance is most enhanced.

It is preferable that the impregnated portion be formed so as to extend over at least half of the surface of the tabular needled blanket continuously and, in the region in which the impregnated portion is formed, the impregnated portion extend over the entire thickness of the needled blanket.

It is particularly preferable that, in the region that extends over a half or more of the surface of the tabular needled blanket, the impregnated portion extend over the entire width and the entire thickness of the needled blanket. It is most preferable that the impregnated portion extend over the entire surface of the tabular needled blanket composed of inorganic fibers.

[Moisture Contents in Impregnated Portion and Heat-Insulating Protective Member for Skid Posts]

In the heat-insulating protective member for skid posts according to the present invention, the amount of moisture included in the impregnated portion is 50 to 400 parts by mass relative to 100 parts by mass of the inorganic fibers included in the impregnated portion. If the amount of moisture included in the impregnated portion is excessively small, the flexibility may be degraded due to the binder effect. Furthermore, the amount of dust particles generated from the fibers may be increased. On the other hand, if the amount of moisture included in the impregnated portion is excessively large, a liquid may leak from the inorganic fibers even when a small amount of pressure is applied to the inorganic fiber formed article. In addition, the inorganic fiber formed article may be crushed by the weight thereof. This increases the degree of detachment of the end surfaces. If the amount of moisture included in the impregnated portion is excessively large, moreover, the sol migrates intensively due to the removal of water, which is referred to as "migration", when the heat-insulating protective member is heated during service. As a result, the amount of oxide precursor deposited in the vicinity of the dried surfaces of the inorganic fibers is increased, while the amount of oxide precursor deposited inside the needled blanket is reduced. This degrades the thermal shock resistance and reduces the thermal shrinkage ratio. That is, for maintaining the uniformity over the entire impregnated portion, it is important to limit the amount of moisture included in the impregnated portion not to exceed 400 parts by mass. The amount of moisture included in the impregnated portion is preferably 80 to 350 parts by mass relative to 100 parts by mass of the inorganic fibers included in the impregnated portion.

The amount of moisture included in the entire heat-insulating protective member for skid posts according to the present invention is 50 to 400 parts by mass relative to 100 parts by mass of the inorganic fibers included in the entire heat-insulating protective member for skid posts. If the amount of moisture included in the heat-insulating protective member for skid posts is less than 50 parts by mass relative to 100 parts by mass of the inorganic fibers, it becomes difficult to maintain the heat-insulating protective member for skid posts to be undried. In addition, the flexibility of the heat-insulating protective member may be degraded. This results in the occurrence of detachment and cracking in the application of the heat-insulating protective member. If the amount of moisture included in the heat-insulating protective member for skid posts is more than 400 parts by mass relative to 100 parts by mass of the inorganic fibers, a liquid may leak from the inorganic fibers even when a small amount of pressure is applied to the heat-insulating protective member for skid posts. In addition, the heat-insulating protective member for skid posts may be crushed by the weight thereof. This increases the degree of detachment of the end surfaces. The amount of moisture included in the entire heat-insulating protective member for skid posts is preferably 150 to 300 parts by mass relative to 100 parts by mass of the inorganic fibers included in the entire heat-insulating protective member for skid posts.

[Amount of Oxide Deposited after Firing]

The needled blanket is impregnated with the oxide-precursor-containing liquid such that the amount of oxide (CaO and $Al_2O_3$) deposited on the impregnated portion after firing (hereinafter, referred to simply as "amount of oxide deposited") is 2 to 50 parts by mass relative to 100 parts by mass of the inorganic fibers included in the impregnated portion. The amount of oxide deposited is preferably 5 to 30 parts by mass and is most preferably 10 to 25 parts by mass relative to 100 parts by mass of the inorganic fibers included in the impregnated portion. If the amount of oxide deposited is small, a desired scale resistance may fail to be achieved. On the other hand, if the amount of oxide deposited is excessively large, the density of the impregnated portion is high. This reduces the thermal shrinkage ratio and degrades the thermal shock resistance and the mechanical-shock resistance. If a large amount of calcium component is present on the surfaces of the fibers, the calcium component and the inorganic fibers form a large amount of low-melting compounds, which degrade the heat resistance of the impregnated portion.

The amount of oxide deposited on the entire heat-insulating protective member for skid posts is preferably 5 to 40 parts by mass and is particularly preferably 8 to 30 parts by mass relative to 100 parts by mass of the inorganic fibers included in the entire heat-insulating protective member for skid posts for the same reasons as for the amount of oxide deposited on the impregnated portion.

The molar ratio of Al to Ca included in the entire impregnated portion of the heat-insulating protective member for skid posts according to the present invention (Al/Ca) may be 10 to 330, is preferably 30 to 100, and is particularly preferably 32 to 70.

The term "entire impregnated portion" used herein refers to the entirety of the inorganic fibers constituting the impregnated portion and the substance deposited on the inorganic fibers. The term "molar ratio of Al to Ca included in the entire impregnated portion (Al/Ca)" used herein refers to the ratio of the sum of the number of moles of Ca included in the inorganic fibers constituting the needled blanket which are present in the impregnated portion of the inorganic fiber formed article and the number of moles of Ca originating from the oxide-precursor-containing liquid to the sum of the number of moles of Al included in the inorganic fibers constituting the needled blanket which are present in the impregnated portion of the inorganic fiber formed article and the number of moles of Al originating from the oxide-precursor-containing liquid. The molar ratio of Al to Ca of the heat-insulating protective member for skid posts (Al/Ca) which has not yet been applied to a skid post is substantially equal to that of the heat-insulating protective member for skid posts that has been applied to a skid post and fired by heating.

The molar ratio between Al, Si, and Ca included in the entire impregnated portion of the heat-insulating protective member for skid posts according to the present invention (Al:Si:Ca) is preferably 77.2 to 79.5:18.9 to 21.6:0.9 to 2.2 in terms of scale resistance, heat resistance, and thermal shock resistance. The number of moles of Al included in the entire impregnated portion is, as described above, the total number of moles of Al included in the inorganic fibers constituting the needled blanket which are present in the impregnated portion and moles of Al originating from the oxide-precursor-containing liquid. The number of moles of Ca included in the entire impregnated portion is, as described above, the total number of moles of Ca included in the inorganic fibers constituting the needled blanket which are present in the impregnated portion and moles of Ca originating from the oxide-precursor-containing liquid. The number of moles of Si is the number of moles of Si included in the inorganic fibers constituting the needled blanket.

The amounts of Al, Ca, and Si included in the impregnated portion may be determined by X-ray fluorescence analysis.

[Action of CaO]

When the heat-insulating protective member for skid posts according to the present invention which includes the impregnated portion is heated in a furnace and the oxide-precursor-containing liquid is fired at a high temperature, part of the CaO component generated from the oxide-precursor-containing liquid diffuses into the inside of the inorganic fibers. Setting the molar ratio of Al to Ca included in the entire impregnated portion (Al/Ca) to be within the above range enables an appropriate amount of CaO to diffuse into the inside of the inorganic fibers when the oxide-precursor-containing liquid is fired at a high temperature. Adding an appropriate amount of CaO to the inside of the inorganic fibers reduces the likelihood of FeO diffusing into the inside of the inorganic fibers. That is, the reaction between the inorganic fibers and FeO may be limited. This enhances the scale resistance of the heat-insulating protective member for skid posts. If the molar ratio of Al to Ca included in the impregnated portion (Al/Ca) is less than 10, the inorganic fibers and CaO diffused into the inside of the inorganic fibers form a large amount of low-melting compounds, which may degrade the heat resistance and the thermal shock resistance. If the molar ratio of Al to Ca included in the impregnated portion (Al/Ca) is more than 330, CaO fails to sufficiently diffuse into the inside of the inorganic fibers and, as a result, the scale resistance may fail to be enhanced. In particular, in the case where inorganic fibers having a mullite ($3Al_2O_3.2SiO_2$) composition are fired at a high temperature, a mullite crystal phase and a crystal phase including a mullite component and CaO diffused therein are formed. In such a case, CaO is diffused into the inside of the fibers while the mullite crystal phase having excellent thermal shock resistance, excellent heat resistance, and excellent mechanical-shock resistance is maintained. This enhances the FeO resistance.

This can be confirmed by determining whether a peak indicating a mullite crystal phase and a peak indicating the $CaO-Al_2O_3-SiO_2$ crystal phase are present in the peaks detected by X-ray diffraction (XRD) after the inorganic fiber formed article has been fired at 1400° C. for 8 hours.

Whether the Ca component is diffused into the inside of the fibers can be confirmed by element mapping with an electron probe micro analyzer (SPMA).

[Dimensions of Heat-Insulating Protective Member for Skid Posts]

The dimensions of the heat-insulating protective member for skid posts according to the present invention are not limited, but preferably 200-mm wide and 200-mm long or more. If the dimensions of the heat-insulating protective member for skid posts are smaller than the above dimensions, the process for applying the heat-insulating protective member to a skid post becomes complex. In addition, the number of heat-insulating protective members for skid posts required for a target to which the heat-insulating protective members are to be applied is increased and, as a result, gaps are likely to be formed between the heat-insulating protective members for skid posts. This may degrade the heat-insulating property.

In the case where the heat-insulating protective member for skid posts according to the present invention is applied to a columnar skid post, it is preferable that the length L of at least one side of the heat-insulating protective member for skid posts be larger than the sum of the length Q of the outer periphery of the skid post and twice the thickness D of the heat-insulating protective member for skid posts. In such a case, the end portions of the heat-insulating protective member for skid posts which is wound on the outer peripheral surface of the skid post can be superimposed on each other and, as a result, gaps are not created. This enhances the heat-insulating property. The heat-insulating protective member for skid posts may be wound around the skid post multiple times. The heat-insulating protective member for skid posts may be wound on another heat-insulating protective member for skid posts which has been arranged on the outer peripheral surface of a skid post. The other heat-insulating protective member for skid posts may be the heat-insulating protective member for skid posts according to the present invention or a heat-insulating protective member for skid posts which is other than the heat-insulating protective member for skid posts according to the present invention. Examples of the heat-insulating protective member for skid posts which is other than the heat-insulating protective member for skid posts according to the present invention include, but are not limited to, the heat-insulating member described in JP 2014-5173 A, the ceramic fiber refractory material formed article described in JP S55-54793 A, and the lightweight inorganic fiber formed article described in JP 2011-208344 A.

The dimensions of the heat-insulating protective member for skid posts according to the present invention are, for example, and not limited to, 200 to 800 mm wide, 1 to 4 m long, and 10 to 25 mm thick.

[Transportation and Application of Heat-Insulating Protective Member for Skid Posts]

In order to prevent the moisture content from being reduced by drying, the heat-insulating protective member for skid posts according to the present invention is preferably packaged by vacuum wrapping or shrink wrapping when being stored or transported. The heat-insulating protective member for skid posts may be formed into a tabular shape or a roll-like shape when being stored or transported.

The heat-insulating protective member for skid posts according to the present invention, which has excellent flexibility, is capable of being readily applied to a cylindrical skid post used in a heating furnace.

The heat-insulating protective member for skid posts according to the present invention may be applied and fixed to a skid post by an appropriate method, such as a method in which an adhesive and mortar are used, a method in which stud pins are used for fixing the heat-insulating protective member to the skid post, or a method in which the outer periphery of the heat-insulating protective member for skid posts is fixed with a tape, a rope, or the like.

It is preferable to apply and fix the heat-insulating protective member for skid posts according to the present invention to a skid post by winding the heat-insulating protective member around the skid post twice or more in order to reduce the likelihood of the heat-insulating protective member for skid posts detaching from the skid post.

A heat-insulating protective member for skid posts that includes an impregnated portion extending over the entire surface and entire thickness of the heat-insulating protective member can be used for protecting skid posts on which scale (FeO) has been deposited. This is because, in the case where a skid post on which FeO is deposited is protected with the heat-insulating protective member for skid posts, the inner surface of the heat-insulating protective member is also eroded by FeO. The end surfaces of the heat-insulating protective member for skid posts, which are highly likely to be exposed to the inside of the furnace, are also preferably the impregnated portion.

When the heat-insulating protective member for skid posts according to the present invention is applied to a skid post, the heat-insulating protective member for skid posts is preferably arranged such that the difference in height between the front and rear ends of the wound heat-insulating protective member is minimized.

Cutting the end sides of the heat-insulating protective member for skid posts at an acute angle enables the heat-insulating protective member to be wound around a skid post multiple times without the difference in height being created or the risk of scale entering the gap. Two or more heat-insulating protective members for skid posts may be used such that any gap is not created.

EXAMPLES

The present invention is described more specifically with reference to Examples and Comparative Examples below. The present invention is not limited by Examples below without departing from the scope of the present invention.

Methods for determining and evaluating the physical properties which were employed in Examples below are as follows.

[Scale Resistance]

Square pieces with sides of 50 mm were cut from the impregnated portion of a heat-insulating protective member for skid posts and superimposed on one another to a thickness of 25 mm or more. The resulting multilayer body was dried at 150° C. for 12 hours to form a specimen. With a square iron pellet with sides of 5 mm having a thickness of 1 mm being placed on the surface of the specimen, the specimen was charged into an electric furnace. Subsequently, the temperature was increased to 1400° C. over 5 hours. After the temperature had been maintained at 1400° C. for 5 hours, the temperature was reduced. The specimen was removed from the furnace and inspected for the change in the appearance. An evaluation was made on the basis of the degree of erosion by iron oxide in the thickness direction in accordance with the following criteria.

<Evaluation Criteria>

⊙: Immersion depth was 5 mm or less

○: Immersion depth was more than 5 mm and 12.5 mm or less

Δ: Immersion depth was more than 12.5 mm and 25.0 mm or less x: Immersion depth was more than 25.0 mm

[Thermal Shrinkage Ratio]

A square piece with sides of 100 mm was cut from the impregnated portion of a heat-insulating protective member for skid posts. After the piece had been dried at 150° C. for 12 hours, it was charged into an electric furnace. Subsequently, the temperature was increased to 1450° C. over 5 hours. After the temperature had been maintained at 1450° C. for 8 hours, the temperature was reduced. The specimen was removed from the furnace and inspected for the change in the dimensions and the appearance. An evaluation of "○" was given when the dimensional change was less than 0.5%. An evaluation of "Δ" was given when the dimensional change was 0.5% or more. An evaluation of "x" was given when the degree of shrinkage was considerably high and the occurrence of warpage or the like was confirmed. An evaluation of "xx" was given when the degree of shrinkage was further high and the occurrence of warpage and cracking was confirmed.

[Flexibility]

The heat-insulating protective member for skid posts was spread flatly and subsequently wound around a paper tube having a diameter of 100 mm and a length of 300 mm such that any gap was not created therebetween. The wounded heat-insulating protective member was again spread and inspected for the appearance. An evaluation of "○" was given when the occurrence of cracking or the like was not confirmed and a change in the appearance was not confirmed. An evaluation of "x" was given when the occurrence of cracking in the surface of the heat-insulating protective member was confirmed.

[Workability]

A heat-insulating protective member for skid posts was wound around a cylinder having a diameter of 400 mm and a length of 300 mm. The end surfaces of the wound heat-insulating protective member for skid posts which were brought into contact with each other were fixed to each other with an inorganic adhesive. Subsequently, the outer periphery of the heat-insulating protective member was fixed with a craft paper-backed tape. The workability of the heat-insulating protective member during the above process was confirmed and evaluated in accordance with the following criteria.

<Evaluation Criteria>

○: The heat-insulating protective member was able to be applied to the cylinder in a suitable manner without the leakage of the impregnation liquid, adhesion failure, or the like.

x: The heat-insulating protective member was able to be applied to the cylinder, but the leakage of the impregnation liquid and adhesion failure occurred.

xx: The heat-insulating protective member was not flexible and unable to be applied to the cylinder.

[Amount of Moisture Included in Heat-Insulating Protective Member for Skid Posts]

The amount of moisture included in the entire heat-insulating protective member for skid posts was determined by drying the heat-insulating protective member for skid posts at 150° C. for 24 hours, calculating the amount of moisture from the difference ($W_1-W_2$) between the mass $W_1$ and mass $W_2$ of the heat-insulating protective member for skid posts which were measured prior and subsequent to the drying of the heat-insulating protective member, respectively, and converting the amount of moisture into the mass of moisture relative to 100 parts by mass of the inorganic fibers.

The amount of moisture included in the impregnated portion of the heat-insulating protective member for skid posts was also determined by drying the impregnated portion cut from the heat-insulating protective member as described above, calculating the amount of moisture from the mass of the impregnated portion which was measured as described above, and converting the amount of moisture into the amount of moisture relative to 100 parts by mass of the inorganic fibers included in the impregnated portion. The term "impregnated portion of the heat-insulating protective member for skid posts" used herein refers to a portion in which the ratio of the amount of moisture to the amount of inorganic fibers is 1% by mass or more.

[Amount of Oxide Deposited]

The amount of oxide (CaO and $Al_2O_3$) deposited on the heat-insulating protective member for skid posts was determined by measuring the mass of the heat-insulating protective member for skid posts which had been fired at 1250° C. for 2 hours, calculating the amount of oxide by subtracting the mass of the inorganic fibers included in the heat-insulating protective member for skid posts (i.e., the mass of the needled blanket that had not been impregnated with the oxidizer-precursor-containing liquid), which had been measured in advance, from the mass of the fired heat-insulating protective member, and converting the amount of oxide into the mass of oxide relative to 100 parts by mass of the inorganic fibers included in the heat-insulating protective member for skid posts.

The amount of oxide deposited on the impregnated portion of the heat-insulating protective member for skid posts was also determined by measuring the mass of the impregnated portion cut from the heat-insulating protective member that had been fired as described above, calculating the amount of oxide as described above, and converting the amount of oxide into the amount of oxide relative to 100 parts by mass of the inorganic fibers included in the impregnated portion.

[Molar Ratio Al:Si:Ca of Impregnated Portion]

The molar ratio Al:Si:Ca of the impregnated portion was determined by X-ray fluorescence analysis and converted into the percentages of the three components.

[Surface Inspection with Scanning Electron Microscope (SEM)]

After the heat-insulating protective member for skid posts had been dried at 150° C. for 24 hours, the surfaces of the inorganic fibers included in the impregnated portion of the heat-insulating protective member for skid posts were inspected with a scanning electron microscope (SEM) in order to determine whether or not the oxide precursor and an oxide produced from the oxide precursor were deposited over the entire surfaces of the inorganic fibers.

Example 1

A needled blanket (product name: MAFTEC™ MLS, produced by Mitsubishi Plastics, Inc., thickness: 12.5 mm, needle-punch density: 5 punches/cm², bulk density: 128 kg/m³, surface density: 1600 g/m²), which was produced by needling an assembly of polycrystalline alumina-silica fibers having an average diameter of 5.5 μm which included 72% by mass of alumina and 28% by mass of silica and substantially did not include fibers having a diameter of 3 μm or less, was formed into a shape having a width of 300 mm and a length of 3000 mm.

For preparing an oxide-precursor-containing liquid, calcium acetate monohydrate was added to an alumina sol solution including acetic acid serving as a dispersant such that the molar ratio of Al to Ca (Al/Ca) was 12. Thus, a liquid containing 8.0% by mass of solid component in terms of the amount of oxide was prepared. The entire needled blanket was impregnated with 12 Kg of this liquid. Subsequently, with an attachment having a length of 1 m being attached to the needled blanket, the liquid was removed by suction at a suction power of 8.0 m³/min over the entire length at intervals of 1 m in the longitudinal direction. Thus, a heat-insulating protective member for skid posts was prepared.

Figure 1:
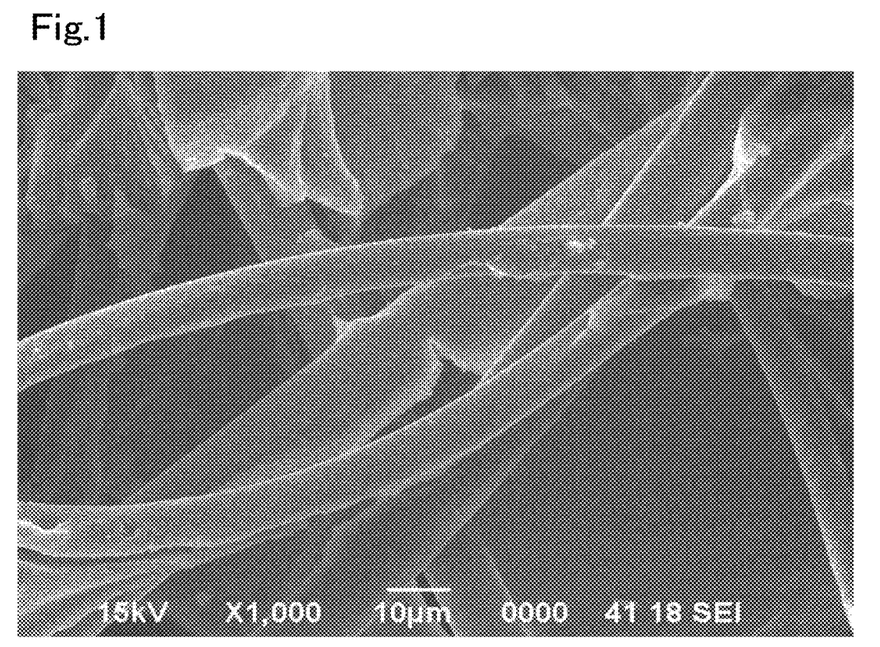
FIG. 1 is an image of surfaces of inorganic fibers included in a heat-insulating protective member for skid posts prepared in Example 1, which was taken with a scanning electron microscope (SEM) after the heat-insulating protective member had been dried.

The heat-insulating protective member for skid posts was evaluated in terms of the amount of moisture included in the entire heat-insulating protective member for skid posts, the amount of moisture included in the impregnated portion, the amount of oxide deposited on the entire heat-insulating protective member, the amount of oxide deposited on the impregnated portion, scale resistance, thermal shrinkage ratio, flexibility, and workability by the above-described measurement methods. Table 1 shows the results. The surfaces of the inorganic fibers were inspected with a scanning electron microscope (SEM). FIG. 1 shows the results.

Example 2

A heat-insulating protective member for skid posts was prepared as in Example 1, except that, after the liquid had been removed by suction, the heat-insulating protective member for skid posts was dried at 100° C. for 3 hours. The heat-insulating protective member was evaluated in terms of the above items as in Example 1. Table 1 shows the results.

Example 3

A heat-insulating protective member for skid posts was prepared as in Example 1, except that the region of the needled blanket which was impregnated with the liquid was reduced by one-half in the longitudinal direction. The heat-insulating protective member was evaluated in terms of the above items as in Example 1. Table 1 shows the results.

Example 4

A heat-insulating protective member for skid posts was prepared as in Example 1, except that the region of the needled blanket which was impregnated with the liquid was reduced by one-half in the thickness direction. The heat-insulating protective member was evaluated in terms of the above items as in Example 1. Table 1 shows the results.

Example 5

A heat-insulating protective member for skid posts was prepared as in Example 1, except that the length of the needled blanket used was reduced by one-half, that is, to 1500 mm, and the amount of oxide-precursor-containing liquid used was changed to 6 Kg. The heat-insulating protective member was evaluated in terms of the above items as in Example 1. Table 1 shows the results.

Example 6

A heat-insulating protective member for skid posts was prepared as in Example 1, except that the suction power at which the liquid was removed was changed to 3 m³/min. The heat-insulating protective member was evaluated in terms of the above items as in Example 1. Table 1 shows the results.

Example 7

A heat-insulating protective member for skid posts was prepared as in Example 1, except that calcium acetate monohydrate was added to the alumina sol solution such that the molar ratio of Al to Ca included in the oxide-precursor-containing liquid (Al/Ca) was 35.4. The heat-insulating protective member was evaluated in terms of the above items as in Example 1. Table 1 shows the results.

Example 8

A heat-insulating protective member for skid posts was prepared as in Example 1, except that calcium acetate monohydrate was added to the alumina sol solution such that the molar ratio of Al to Ca included in the oxide-precursor-containing liquid (Al/Ca) was 20.8. The heat-insulating protective member was evaluated in terms of the above items as in Example 1. Table 1 shows the results.

Example 9

A heat-insulating protective member for skid posts was prepared as in Example 1, except that calcium acetate monohydrate was added to the alumina sol solution such that the molar ratio of Al to Ca included in the oxide-precursor-containing liquid (Al/Ca) was 9.9. The heat-insulating protective member was evaluated in terms of the above items as in Example 1. Table 1 shows the results.

Example 10

A heat-insulating protective member for skid posts was prepared as in Example 1, except that calcium acetate monohydrate was added to the alumina sol solution such that the molar ratio of Al to Ca included in the oxide-precursor-containing liquid (Al/Ca) was 6.2. The heat-insulating protective member was evaluated in terms of the above items as in Example 1. Table 1 shows the results.

Comparative Example 1

A needled blanket prepared as in Example 1 was directly used as a heat-insulating protective member for skid posts. The heat-insulating protective member was evaluated in terms of the above items as in Example 1. Table 1 shows the results.

Comparative Example 2

A heat-insulating protective member for skid posts was prepared as in Example 1, except that, after the needled blanket was impregnated with the oxide-precursor-containing liquid, the liquid was not removed by suction. The heat-insulating protective member was evaluated in terms of the above items as in Example 1. Table 1 shows the results.

Comparative Example 3

A heat-insulating protective member for skid posts was prepared as in Example 2, except that drying was performed at 150° C. for 12 hours. The heat-insulating protective member was evaluated in terms of the above items as in Example 1. Table 1 shows the results.

Comparative Example 4

A heat-insulating protective member for skid posts was prepared as in Example 1, except that a silica sol containing 10% by mass of solid components was used as an oxide-precursor-containing liquid. The heat-insulating protective member was evaluated in terms of the above items as in Example 1. Table 1 shows the results.

Comparative Example 5

The needled blanket used in Example 1 was fixed to the cylinder used in the evaluation of workability with stud pins.

Subsequently, 6 Kg of the oxide-precursor-containing liquid used in Example 1 was sprayed to the needled blanket. The resulting needled blanket was removed from the cylinder and evaluated as in Example 1. Table 1 shows the results.

Comparative Example 6

The needled blanket was evaluated as in Comparative Example 5, except that the amount of oxide-precursor-containing liquid sprayed to the needled blanket was changed to 1 Kg. Table 1 shows the results.

The tests conducted in Comparative Examples 5 and 6 are equivalent to a case where a needled blanket composed of inorganic fibers is fixed to a cylinder and an inorganic binder is subsequently sprayed to the needled blanket.

Comparative Example 7

The oxide-precursor-containing liquid prepared in Example 1 was dried at 150° C. for 12 hours and subsequently fired at 1300° C. for 8 hours. The fired substance was ground with a mortar and subsequently pulverized with a ball mill until the median of the particle diameter reached 5 μm. An analysis of the resulting powder by XRD confirmed the presence of the CaO.6Al$_2$O$_3$ and CaO.2Al$_2$O$_3$ crystal phases.

Although the powder prepared by pulverization was dispersed in water at a concentration of 8.0% by mass, it was immediately precipitated. Thus, attempt was made to impregnate a needled blanket with the dispersion liquid as in Example 1 by stirring the dispersion liquid immediately before the impregnation. However, the powder particles, which had large diameters, were deposited on the surface of the inorganic fiber assembly constituting the needled blanket, and the inside of the inorganic fiber assembly failed to be impregnated with the powder particles. It was also confirmed that the CaO.Al$_2$O$_3$ compound deposited on the surface of the inorganic fiber assembly easily detached therefrom.

Comparative Example 8

The fired substance prepared in Comparative Example 7 (substance fired at 1300° C. for 8 hours) was pulverized with a ball mill until the median of the particle diameter reached 0.5 μm. The powder prepared by pulverization was dispersed in water at a concentration of 8.0% by mass. The needled blanket was impregnated with the dispersion liquid while performing suction with an attachment that had been attached to the needled blanket prior to the impregnation. Thus, a heat-insulating protective member for skid posts was prepared. The heat-insulating protective member for skid posts was evaluated in terms of the above items as in Example 1. Table 1 shows the results.

Figure 2:
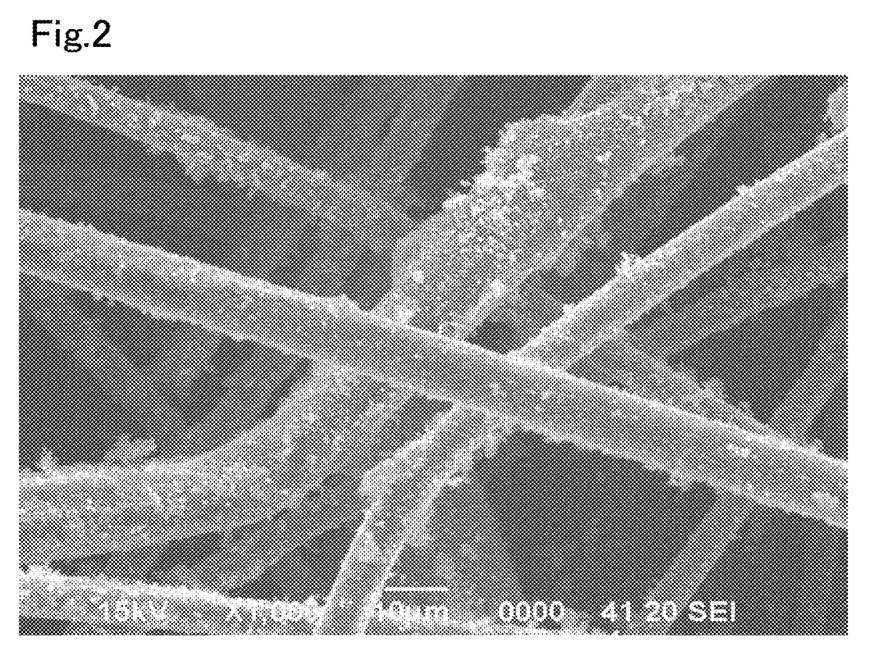
FIG. 2 is an image of surfaces of inorganic fibers included in a heat-insulating protective member for skid posts prepared in Comparative Example 8, which was taken with a scanning electron microscope (SEM) after the heat-insulating protective member had been dried.

The surfaces of the inorganic fibers were inspected with a scanning electron microscope (SEM). FIG. 2 shows the results.

TABLE 1

| | Al/Ca molar ratio of oxide-precursor-containing liquid | Amount of moisture (mass part)✕ | | Amount of oxide deposited (mass part)✕ | | Al:Si:Ca of impregnated portion (mol %) | | | Al/Ca molar ratio of impregnated portion | Scale resistance | Thermal shrinkage Shrinkage (%) | Evaluation | Flexibility | Workability |
|---|---|---|---|---|---|---|---|---|---|---|---|---|---|---|
| | | Entirety | Impregnated portion | Entirety | Impregnated portion | Al | Si | Ca | | | | | | |
| Example 1 | 12 | 200 | 200 | 18 | 18 | 77.7 | 21.1 | 1.2 | 64.12 | ○ | 0.6 | Δ | ○ | ○ |
| Example 2 | 12 | 90 | 180 | 18 | 18 | 77.7 | 21.1 | 1.2 | 64.12 | ○ | 0.7 | Δ | ○ | ○ |
| Example 3 | 12 | 100 | 200 | 9 | 18 | 77.7 | 21.1 | 1.2 | 64.12 | ○ | 0.6 | Δ | ○ | ○ |
| Example 4 | 12 | 100 | 100 | 9 | 18 | 77.7 | 21.1 | 1.2 | 64.12 | ○ | 0.6 | Δ | ○ | ○ |
| Example 5 | 12 | 200 | 200 | 18 | 18 | 77.7 | 21.1 | 1.2 | 64.12 | ○ | 0.6 | Δ | ○ | ○ |
| Example 6 | 12 | 300 | 300 | 26 | 26 | 78.6 | 19.7 | 1.6 | 48.07 | ◎ | 0.8 | Δ | ○ | ○ |
| Example 7 | 35.4 | 200 | 200 | 18 | 18 | 78.6 | 21.1 | 0.3 | 247.90 | Δ | 0.8 | Δ | ○ | ○ |
| Example 8 | 20.8 | 200 | 200 | 18 | 18 | 78.2 | 21.1 | 0.7 | 108.46 | Δ | 0.7 | Δ | ○ | ○ |
| Example 9 | 9.9 | 200 | 200 | 18 | 18 | 77.5 | 21.1 | 1.4 | 53.68 | ○ | 0.6 | Δ | ○ | ○ |
| Example 10 | 6.2 | 200 | 200 | 18 | 18 | 76.7 | 21.1 | 2.2 | 35.18 | ○ | 0.3 | ○ | ○ | ○ |
| Comparative example 1 | — | 0 | 0 | 0 | 0 | 75.0 | 25.0 | 0.0 | — | × | 0.3 | ○ | ○ | ○ |
| Comparative example 2 | 12 | 440 | 440 | 48 | 48 | 80.7 | 16.7 | 2.6 | 31.53 | ◎ | — | × | ○ | × |
| Comparative example 3 | 12 | 0 | 0 | 18 | 18 | 77.7 | 21.1 | 1.2 | 64.12 | ○ | 0.6 | Δ | × | × × |
| Comparative example 4 | — | 160 | 160 | 18 | 18 | 64.6 | 35.4 | 0.0 | — | × | 0.5 | Δ | ○ | ○ |
| Comparative example 5 | 12 | 300 | 680 | 33 | 55 | 81.3 | 15.9 | 2.8 | 29.04 | ◎ | — | × × | — | — |
| Comparative example 6 | 12 | 60 | 680 | 6 | 55 | 81.3 | 15.9 | 2.8 | 29.04 | ◎ | — | × × | — | — |
| Comparative example 7 | 12 | Unable to be evaluated because the anti-scale component did not permeate inside | | | | | | | | × | 0.4 | ○ | ○ | ○ |
| Comparative example 8 | 12 | 200 | 200 | 18 | 18 | 77.7 | 21.1 | 1.2 | 64.12 | × | 0.5 | Δ | ○ | ○ |

✕parts by mass relative to 100 parts by mass of inorganic fibers

DISCUSSION

As shown in Table 1, the heat-insulating protective members for skid posts which were prepared in Examples 1 to 10 had excellent scale resistance, a low thermal shrinkage (i.e., high thermal shock resistance), excellent flexibility, and excellent workability.

An inspection of the surfaces of the inorganic fibers included in the heat-insulating protective member for skid posts prepared in Example 1 which was conducted with an SEM after the heat-insulating protective member had been dried under the predetermined conditions confirmed that an oxide originating from the oxide precursor was present over the entire surfaces of the inorganic fibers. This presumably enhanced the scale resistance of the heat-insulating protective member for skid posts.

In contrast, the heat-insulating protective member for skid posts which was prepared in Comparative Example 1 had poor scale resistance. The heat-insulating protective member for skid posts which was prepared in Comparative Example 2 contained a large amount of moisture. As a result, the amount of solid component of the inorganic binders included in the surface of the heat-insulating protective member for skid posts was increased due to the migration that occurred when drying was performed. Consequently, the amount of substance deposited in the vicinity of the surface of the heat-insulating protective member for skid posts which was prepared in Comparative Example 2 was large. As a result, a large amount of Ca component was diffused into the inside of the inorganic fibers in the vicinity of the surface of the heat-insulating protective member for skid posts when firing was performed. This degraded the thermal shock resistance and caused the surface of the heat-insulating protective member for skid posts to crack (warp and crack) when firing was performed.

The heat-insulating protective member for skid posts which was prepared in Comparative Example 3 became inflexible and not applicable to skid posts after being dried.

The heat-insulating protective member for skid posts which was prepared in Comparative Example 4 (heat-insulating protective member for skid posts which was prepared using a silica sol) had poor scale resistance.

The heat-insulating protective members for skid posts which were prepared in Comparative Examples 5 and 6, in which the inorganic binder was deposited on the needled blanket by spraying the inorganic binder to the needled blanket (spray coating), the needled blanket failed to be impregnated with the inorganic binder uniformly in the thickness direction of the needled blanket, because spray coating increases the density of solid component of the inorganic binder in the vicinity of the surface of the needled blanket. When the inorganic binder is sprayed to the needled blanket such that the amount of inorganic binder deposited on the entire heat-insulating protective member for skid posts is substantially equal to that in Example 1, the inorganic binder is localized only in the vicinity of the surface of the heat-insulating protective member and, accordingly, the density of the solid component of the inorganic binder in the surface of the heat-insulating protective member is increased. Furthermore, the amount of moisture included in the impregnated portion is increased. As a result, the amount of solid component of the inorganic binder present on the surface of the heat-insulating protective member for skid posts is increased due to the migration which occurs when drying is performed. This caused the surface of the heat-insulating protective member for skid posts to crack (warp and crack) when firing was performed.

In the heat-insulating protective member for skid posts prepared in Comparative Example 7, the scale-resistant component that was simply deposited on the surface was easily detached. Furthermore, it was not possible to hold the scale-resistant component in the inside of the heat-insulating protective member. Thus, the scale resistance failed to be achieved.

In the method of Comparative Example 8, it was difficult to impregnate the surface of the heat-insulating protective member for skid posts with the oxide uniformly with high reproducibility. An inspection of the surfaces of the inorganic fibers included in the heat-insulating protective member for skid posts with an SEM which was conducted after the heat-insulating protective member had been dried under the predetermined conditions confirmed the precipitated solid component was not present over the entire surfaces of the fibers but scattered locally on the surfaces of the fibers. This presumably degraded the scale resistance of the heat-insulating protective member for skid posts.

Although the present invention has been described in detail with reference to particular embodiments, it is apparent to a person skilled in the art that various modifications can be made therein without departing from the spirit and scope of the present invention.

The present application is based on Japanese Patent Application No. 2014-231461 filed on Nov. 14, 2014, and Japanese Patent Application No. 2015-098111 filed on May 13, 2015, which are incorporated herein by reference in their entirety.

The invention claimed is:

1. A heat-insulating protective member for a skid post, comprising:
    a needled blanket including inorganic fibers; and
    an oxide-precursor-containing liquid that is undried, the needled blanket having an impregnated portion which is impregnated with the oxide-precursor-containing liquid,
    wherein
    an amount of moisture included in the impregnated portion is 50 to 400 parts by mass relative to 100 parts by mass of the inorganic fibers included in the impregnated portion,
    an amount of moisture included in the heat-insulating protective member is 50 to 400 parts by mass relative to 100 parts by mass of the inorganic fibers included in the heat-insulating protective member,
    the oxide-precursor-containing liquid comprises an oxide-precursor composition, the oxide-precursor composition forming an alumina-calcia composition comprising aluminum oxide and calcium oxide when the oxide-precursor-containing liquid is fired at a temperature of 1400° C. for 8 hours,
    an amount of the oxide-precursor-containing liquid deposited on the impregnated portion is 2 to 50 parts by mass relative to 100 parts by mass of the inorganic fibers included in the impregnated portion in terms of the amount of oxide, and
    a molar ratio of Al to Ca included in the impregnated portion is 10 or more and 330 or less.

2. The heat-insulating protective member according to claim 1, wherein the inorganic fiber comprises Si, and a molar ratio of Al:Si:Ca in the impregnated portion is 77.2 to 79.5:18.9 to 21.6:0.9 to 2.2.

3. The heat-insulating protective member according to claim 1, wherein the oxide-precursor-containing liquid is tinted, and the impregnated portion is tinted accordingly.

4. The heat-insulating protective member according to claim 1, wherein the impregnated portion continuously extends over a region that is at least half of a surface of the needled blanket and, in the region over which the impregnated portion extends, the impregnated portion extends over an entire thickness of the needled blanket including inorganic fibers.

5. The heat-insulating protective member according to claim 1, wherein the needled blanket comprises an inorganic fiber formed article having a roll shape.

6. A method for applying a heat-insulating protective member for a skid post, the method comprising:
covering the skid post with the heat-insulating protective member according to claim 1 and
fixing the heat-insulating protective member to the skid post.

7. The heat-insulating protective member according to claim 1, wherein the inorganic fibers are alumina-silica fibers.

8. The heat-insulating protective member according to claim 1, wherein the inorganic fibers are polycrystalline alumina-silica fibers.

9. The heat-insulating protective member according to claim 7, wherein the alumina-silica fibers have a mullite composition and a mass ratio of alumina to silica included in the alumina-silica fibers is in a range of 65/35 to 98/2.

10. The heat-insulating protective member according to claim 7, wherein the alumina-silica fibers have a mullite composition and a mass ratio of alumina to silica included in the alumina-silica fibers is in a range of 70/30 to 95/5.

11. The heat-insulating protective member according to claim 7, wherein the alumina-silica fibers have a mullite composition and a mass ratio of alumina to silica included in the alumina-silica fibers is in a range of 70/30 to 74/26.

12. The heat-insulating protective member according to claim 8, wherein 80% by mass or more of the inorganic fibers are the polycrystalline alumina-silica fibers.

13. The heat-insulating protective member according to claim 8, wherein an entirety of the inorganic fibers is the polycrystalline alumina-silica fibers.

14. The heat-insulating protective member according to claim 7, wherein a molar ratio of Ca to Al included in the inorganic fibers is 0.03 or less.

15. The heat-insulating protective member according to claim 7, wherein the inorganic fibers do not contain Ca.

16. The heat-insulating protective member according to claim 1, wherein a concentration of an oxide precursor in the oxide-precursor-containing liquid is 2% to 30% by mass as a concentration of a solid component in terms of an amount of oxide.

17. The heat-insulating protective member according to claim 1, wherein a concentration of an oxide precursor in the oxide-precursor-containing liquid is 5% to 10% by mass as a concentration of a solid component in terms of an amount of oxide.

* * * * *